(12) United States Patent
Oggier et al.

(10) Patent No.: US 10,401,498 B2
(45) Date of Patent: Sep. 3, 2019

(54) SENSOR SYSTEM WITH ACTIVE ILLUMINATION

(71) Applicant: ams Sensors Singapore Pte. Ltd., Singapore (SG)

(72) Inventors: Thierry Oggier, Zürich (CH); Mathias Deschler, Fribourg (CH); Stéphane Kaloustian, Zimmerwald (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 859 days.

(21) Appl. No.: 14/895,068

(22) PCT Filed: Jun. 5, 2014

(86) PCT No.: PCT/EP2014/001526
§ 371 (c)(1),
(2) Date: Dec. 1, 2015

(87) PCT Pub. No.: WO2014/195020
PCT Pub. Date: Dec. 11, 2014

(65) Prior Publication Data
US 2016/0109575 A1    Apr. 21, 2016

Related U.S. Application Data

(60) Provisional application No. 61/831,647, filed on Jun. 6, 2013.

(51) Int. Cl.
*G01C 3/08* (2006.01)
*G01S 17/89* (2006.01)
(Continued)

(52) U.S. Cl.
CPC .............. *G01S 17/89* (2013.01); *G01S 7/484* (2013.01); *G01S 7/4911* (2013.01); *G01S 7/4915* (2013.01)

(58) Field of Classification Search
CPC ........ G01S 17/89; G01S 7/484; G01S 7/4915; G01S 7/4911
(Continued)

(56) References Cited

U.S. PATENT DOCUMENTS 9,101,055 B2    8/2015   Kim et al.
2004/0263510 A1   12/2004   Marschner et al.
(Continued)

FOREIGN PATENT DOCUMENTS

CN         1704776 A      12/2005
CN       102027388 A       4/2011
(Continued)

OTHER PUBLICATIONS

European Patent Office, International Search Report for Application No. PCT/EP2014/001526 dated Aug. 21, 2014.

*Primary Examiner* — Mark Hellner
(74) *Attorney, Agent, or Firm* — Fish & Richardson P.C.

(57) ABSTRACT

The present invention relates to vision sensors based on an active illumination. An imaging system includes an imaging sensor and is adapted to process an image of a scene being illuminated by at least two different illumination sources each having a wavelength in the near infrared range. In a variant, the imaging system is adapted to use an illumination source having a modulation frequency below the modulation frequency used to perform a three dimensional time of flight measurement. In a variant, the imaging system is adapted to acquire a reduced number of samples per frame than used in time of flight measurements.

14 Claims, 10 Drawing Sheets

(51) Int. Cl.
*G01S 7/484* (2006.01)
*G01S 7/491* (2006.01)

(58) Field of Classification Search
USPC ........................................................ 356/5.01
See application file for complete search history.

(56) References Cited

U.S. PATENT DOCUMENTS

| | | | |
|---|---|---|---|
| 2005/0062743 A1 | 3/2005 | Marschner et al. | |
| 2005/0162638 A1 | 7/2005 | Suzuki et al. | |
| 2005/0190206 A1 | 9/2005 | Lang et al. | |
| 2005/0249377 A1 | 11/2005 | Fouquet et al. | |
| 2009/0020687 A1 | 1/2009 | Lehmann et al. | |
| 2010/0238784 A1* | 9/2010 | Takahashi | G11B 7/1275 369/121 |
| 2011/0058153 A1 | 3/2011 | Van Nieuwenhove et al. | |
| 2012/0176476 A1* | 7/2012 | Schmidt | G01S 17/89 348/46 |
| 2012/0287247 A1* | 11/2012 | Stenger | H04N 13/271 348/47 |
| 2013/0002823 A1 | 1/2013 | Lim et al. | |
| 2013/0314693 A1* | 11/2013 | Skidmore | G01S 13/88 356/5.01 |

FOREIGN PATENT DOCUMENTS

| | | |
|---|---|---|
| EP | 2017651 | 1/2009 |
| EP | 2 116 864 | 11/2009 |
| EP | 2 175 234 | 4/2010 |
| JP | 2002123837 A | 4/2002 |
| JP | 2006071784 A | 3/2006 |
| JP | 2010091569 A | 4/2010 |
| JP | 2011027707 A | 2/2011 |
| JP | 2011520116 A | 7/2011 |
| WO | WO 2009135952 | 11/2009 |

* cited by examiner

SENSOR SYSTEM WITH ACTIVE ILLUMINATION

FIELD OF THE INVENTION

The present invention relates to vision sensors based on an active illumination. The invention improves image quality of an active imaging system, improves the dynamic range and its background light stability. Such sensors typically are used to detect and measure their surroundings, objects or people.

BACKGROUND ART

Active illuminations are implemented in many camera designs to improve the camera measurement results. Camera is understood as an electro-optical device containing an image sensor with an array of pixels.

In many machine vision applications, active illuminations are used to guarantee for certain light intensity level on the camera system. By doing so, the performance of an active system becomes less prone to lighting changes in its surrounding. The stability and reliability is improved. In addition, by adding illumination power to the system, shorter exposures can be set and higher frame rates achieved.

Other sensors with an active illumination camera system use specific properties of the object of interest in the scene, e.g. an application might use reflectors in the scene that can easily be recognized and possibly tracked.

Other applications are using specific reflection properties of the object of interest such as the reflection properties of eyes. The typical back-reflection of the eyes captured by a system with active illumination can be used to detect and track eyes and to count the eye blinking to e.g. check a driver's drowsiness and build a fatigue measurement sensor.

In interferometers, an active system illuminates the object of interest and a reference target. Based on the interference of the reflections, depths can be measured and analyzed.

Other active systems modulate the illumination to get more information about its surroundings. Such illuminations are typically modulated in time (temporal modulation) or in space and can be applied to e.g. measure distances to map the environment in 3D. Temporal modulation is implemented in so-called time-of-flight (TOF) cameras (indirect and direct); spatial modulation is used in triangulation-based depth measurement system, also called structured light technology.

Time of flight image sensor pixels are dedicated pixels designs to guarantee an extremely fast transfer of the photogenerated charges to their storage nodes. Higher modulation frequencies result in better depth noise performance. Therefore, TOF demodulation pixels typically work in the range of a few tens of MHz up to a several hundreds of MHz. Further, TOF pixels often include background light suppression on pixel-level, in order to increase the dynamic range of the TOF imaging system. In most implementations, TOF pixels include two storage nodes to store and integrate two sampled signals per pixel.

DISCLOSURE OF THE INVENTION

The robustness of all actively illuminated imaging systems benefit if background light signal such as sun light can be removed. Most of the time, background light signal cancellation is achieved by the acquisition of two consecutive images, one with illumination turned on, one with the illumination turned off. The subtraction of the two images results in an image including the intensity information of the active illumination only. The drawback of such an approach is first that the system needs to acquire two separate images. The scene or object in the scene might change different from image to image and the background subtraction in that case not ideal. Further, the two acquired images need to handle the full dynamic signal range from the background light and the active light. Even though the background light signal is not required, it eats up the dynamic range of the system.

It is an object of this invention to provide an imaging system with improved dynamic range. It is a further objective of this invention to provide an imaging system for three-dimensional measurement with improved resolution and less optical power consumption. It is further an object of this invention to provide a two-dimensional intensity and a three-dimensional imaging system.

According to the present invention, these objectives are achieved particularly through the features of the independent claims. In addition, further advantageous embodiments follow from the dependent claims and the description.

According to the present invention an imaging system includes an imaging sensor. The imaging system is adapted to process an image of a scene being illuminated by at least two different illumination sources each having a wavelength in the near infrared range. Preferably, the wavelength is between 800 and 1000 nm. The illumination sources may be placed next to the imaging sensor and may be synchronized with the image sensor. The at least two illumination sources may be placed to minimize occlusion.

In some embodiments, the wavelengths of the at least two different illumination sources are different, e.g. at least one illumination source is at around 850 nm and at least one illumination source is at around 940 nm.

In some embodiments, the at least two different illumination sources include at least one structured illumination source. For example, in case of the image sensor being a time-of-flight image sensor, this provides the benefit of the advantages provided by the time of flight measurement and the structured illumination source measurement.

In some embodiments, the at least two different illumination sources include at least one uniform illumination source.

In some embodiments, the at least two different illumination sources are each in the near infrared range but include at least one uniform illumination source and at least one structured illumination source. The acquisition of an image based on the structured illumination source may be interleaved with the acquisitions based on the uniform illumination source. The actual raw images based on the structured illumination source do not represent its acquired environment in a conventional colour or intensity representation. For this reason, state-of-the art systems based on structured illumination sources add a second image sensing device, typically an RGB sensor. By implementing two different illumination sources as proposed in the invention, for example, one structured illumination source and one uniform illumination source, the imaging system may derive the depth information and generate a representative intensity (or black and white) image by the same image sensor. This further allows an easy and one to one mapping of the 3D map onto the 2D intensity image. In case the image sensor is a TOF image sensor, the TOF image sensor and the two different illumination sources can be further temporally modulated and synchronized.

In some embodiments, the imaging system includes a structured illumination source and a uniform illumination source, each having similar central wavelengths, both preferably between 800 and 1000 nm. In such an embodiment, the image from the structured illumination source and the image from the uniform illumination source can each be imaged throughout the same optical path and a narrow optical bandpass filter can be implemented in the optical path. The implementation of a narrow bandpass filter allows to optically blocking out as much of the background light signal as possible.

In some embodiments, the image sensor is a time of flight sensor.

In some embodiments, the at least two different illumination sources include at least one illumination source which is temporally modulated during exposure. Appropriate temporal modulation scheme enable to reduce artefacts caused by changing scene or moving objects during the acquisition and further enable to avoid interferences from other imaging system in the area.

In some embodiments, the at least two different illumination sources are on the same emitting die. This is of special interest, in case the at least two illuminations sources are structured illumination sources and are both temporally modulated. A system set up with the at least two structured illumination sources on the same emitting die and modulate them in sync with the image sensor allows higher information density level on the structured image.

Moreover, the invention is directed to an imaging method using an imaging sensor. Images of a scene being illuminated by at least two different illumination sources each having a wavelength in the near infrared range is processed. In a variant, the wavelengths of the at least two different illumination sources are different. In a variant, the at least two different illumination sources include at least one structured illumination source. In a variant, the at least two different illumination sources include at least one uniform illumination source. In a variant, the image sensor used is a time of flight sensor. In a variant, the at least two different illumination sources include at least one uniform illumination source modulated with a modulation frequency below the modulation frequency used in time of flight measurement. In a variant, the at least two different illumination sources include at least one structured illumination source which is temporally modulated during exposure. In a variant, the at least two different illumination sources are on the same light emitting die.

According to the present invention, an imaging system including a time of flight sensor is adapted to use an illumination source having a modulation frequency below the modulation frequency used to perform a 3 dimensional time of flight measurement.

In preferred specific embodiments, the present invention proposes to implement in the imaging system a time-of-flight sensors or architectures with typically two storage nodes per pixel, preferably even containing some sort of in-pixel background suppressing capability. Further, in the actively illuminated imaging system, the time of flight image sensor and the illumination source are controlled with such low modulation frequencies that the actual time-of-flight of the signal has a negligible effect on the sampling signals. Further, the invention proposes to implement an acquisition timing on the imaging system that results in a number of samples and acquisitions that are not sufficient to perform actual time-of-flight measurements and base the image evaluation on those acquisitions only. Time-of-flight pixels include in most practical implementation two storage nodes and capture at least two but most commonly four consequent but phase delayed images to derive depth information. In this embodiment, one storage node of the pixel is preferably used to integrate background light only, which then is subtracted from the other storage node, in which the background light signal together with the actively emitted and reflected light is integrated. The acquisition and integration of the signals, and their transfer to the two time-of-flight pixel storage nodes is preferably repeated and interleaved many times during an acquisition. The resulting differential pixel output will then be a representation of the actively emitted signal only, which makes the system more robust with respect to changing lighting conditions in the surroundings.

In some embodiments, the modulation frequency is between 100 Hz and 1 MHz. The slower modulation reduces power consumption of the imaging system compared to toggling at a few tens of MHz in state-of-the-art time-of-flight measurement systems. Further, it reduces the speed requirement of the illumination sources and driver and increases the modulation and demodulation efficiency. Highly efficient high power light sources such as high power LEDs that are typically too slow for time-of-flight measurements can be implemented.

In some embodiments, the imaging system is adapted to perform a direct subtraction on the level of a pixel of the time-of-flight sensor. The on-pixel background light cancellation of time-of-flight pixels helps in other systems with active illumination sources to avoid saturation due to background light. In addition, the requirements to the analogue to digital conversion are relaxed since the background level is already subtracted on pixel-level and does not need to be converted anymore. Further, light modulation within a system with active illumination, interleaving the integration of signal light and background light during the same frame acquisition, and integrating over several cycles reduces challenges of motion in the scene, and with appropriate temporal modulation schemes even enables parallel operation of several systems with reduced interferences.

In some embodiments, the imaging system is adapted to use a structured illumination source. The structured illumination source is synchronized with the the time-of-flight image sensor and is used to capture the image based on the structured illumination source and to derive depth information.

In some embodiments, the imaging system includes a time-of-flight image sensor and at least one illumination source. The time-of-flight image sensor is used to sample the back-reflected light. The evaluation of the signal is based on a number of acquisitions and acquired samples per frame, which are not sufficient to derive depth information based on the time-of-flight principle.

In some embodiments, the imaging system is adapted to use a pseudo-random modulated illumination source, so that different interferences between different acquisition systems are minimized.

In some embodiments, the imaging system is adapted to use at least two illumination sources having at least two different wavelengths. By doing a differential readout or on-pixel subtraction, the difference image of the two illumination sources can directly be measured. This enables, for example, to build a highly robust eye tracking system.

In some embodiments, the present invention provides an imaging system which uses a time-of-flight sensor, wherein an illumination source has a modulation frequency below the modulation frequency used to perform a three dimensional time of flight measurement.

In some embodiments, the imaging system is adapted to acquire a reduced number of samples per frame than required to perform time of flight measurements.

In some embodiments, the timing of an imaging system including a time-of-flight sensor and at least one illumination source is adapted to acquire a reduced number of samples per frame than required to derive time of flight measurements.

Moreover, the invention is directed to an imaging method using a time-of-flight sensor. An illumination source having a modulation frequency below the modulation frequency used in time of flight measurements is used. In a variant, the modulation frequency used is between 100 Hz and 1 MHz. In a variant, a direct subtraction on the level of a pixel of the time-of-flight sensor is performed. In a variant, a structured illumination source is used. In a variant, two illumination sources having at least two different wavelengths are used. In a variant, a pseudo-random temporally modulated illumination source is used. In a variant, a reduced number of samples per frame than used in time of flight measurements is acquired.

According to the present invention, the imaging system is adapted to acquire a reduced number of samples per frame than used in time of flight measurements.

In some embodiments, the imaging system is adapted to use an illumination source having a modulation frequency below the modulation frequency used in time of flight measurements, in particular a modulation frequency between 100 Hz and 1 MHz.

In some embodiments, the imaging system is adapted to perform a direct subtraction on the level of a pixel of the time-of-flight sensor.

In some embodiment, the imaging system is adapted to use a structured illumination source.

In some embodiments, the imaging system is adapted to use at least two illumination sources having at least two different wavelengths.

In some embodiments, the imaging system is adapted to use a pseudo-random temporally modulated illumination source.

Moreover, the invention is directed to an imaging method using a time-of-flight sensor. A reduced number of samples per frame than used in time of flight measurements is acquired. In a variant, an illumination source having a modulation frequency below the modulation frequency used in time of flight measurements is used, in particular a modulation frequency between 100 Hz and 1 MHz. In a variant, a direct subtraction on the level of a pixel of the time-of-flight sensor is performed. In a variant, a structured illumination source is used. In a variant, two illumination sources having at least two different wavelengths are used. In a variant, a pseudo-random temporally modulated illumination source is used.

BRIEF DESCRIPTION OF THE DRAWINGS

The herein described invention will be more fully understood from the detailed description given herein below and the accompanying drawings which should not be considered limiting to the invention described in the appended claims. The drawings are showing:

MODE(S) FOR CARRYING OUT THE INVENTION

Figure 1A:
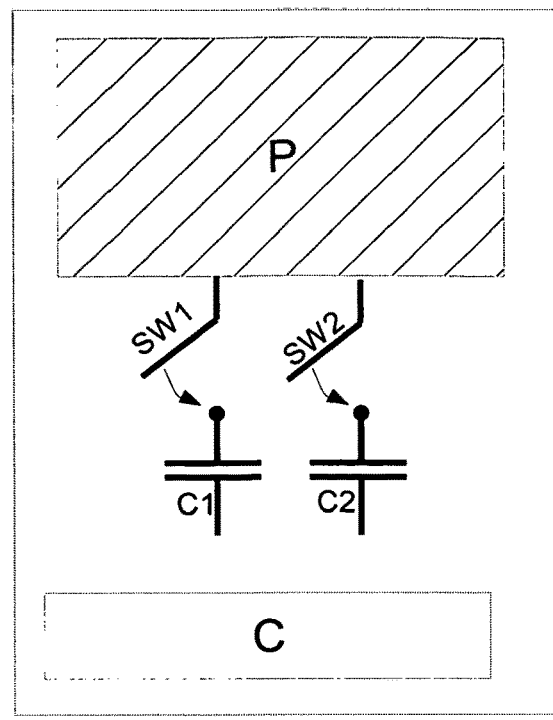
FIG. 1 a) shows a diagram of the state-of-the-art TOF pixel with the different building blocks. b) to d) plot prior art of timing diagrams and samplings to derive depth measurement based on the time-of-flight principle.

Time-of-flight imaging systems area capable to determine the time it takes to the emitted light to travel from the measurement system to the object and back. The emitted light signal is reflected by an object at a certain distance. This distance corresponds to a time delay from the emitted signal to the received signal caused by the travel time of the light from the measurement system to the object and back. In indirect time-of-flight measurements, the distance-dependant time delay corresponds to a phase delay of the emitted to the received signals. Further, the received signal not only includes the back-reflected emitted signal, but may also have background light signal from e.g. the sun or other light sources. A state-of-the-art time-of-flight pixel is illustrated in FIG. 1a. The time-of-flight pixel includes a photo-sensitive area P, connected with a first switch SW1 to storage node C1 and connected with a second switch SW2 to storage node C2. The sampling of the photo-generated electrons is done by closing switch SW1 and opening SW2 or vice versa. The switches SW1 and SW2 are synchronized to an illumination source by a controller. In order to enable reasonable time of flight measurements, the switches SW1 and SW2 and illumination sources need to operate in the range of around 10 MHz to above 200 MHz and the photo-generated charges have to be transferred from the photo-sensitive area P to either storage node C1 or C2 within a few ns. Time-of-flight pixels are specifically designed to reach such high-speed samplings. Possible implementations of such high-speed time-of-flight pixel architectures are described in patents U.S. Pat. No. 5,856,667, EP100998481, EP1513202B1 or U.S. Pat. No. 7,884,310B2. The output circuitry C of the time-of-flight pixel typically includes a readout amplifier and a reset node. In many time-of-flight pixel implementations, the in-pixel output circuitry C further includes a common level removal or background subtraction circuitry of the two samples in the storage nodes C1 and C2. Such in-pixel common signal level removal drastically increases the dynamic range of time-of-flight pixels. Possible implementations that perform a common level removal of the samples while integrating are presented in PCT publication WO2009135952A2 and in U.S. Pat. No. 7,574, 190B2. An approach of another common signal level subtraction of the samples done after the exposure during the readout cycle of the data is described in U.S. Pat. No. 7,897,928B2.

Figure 1B:
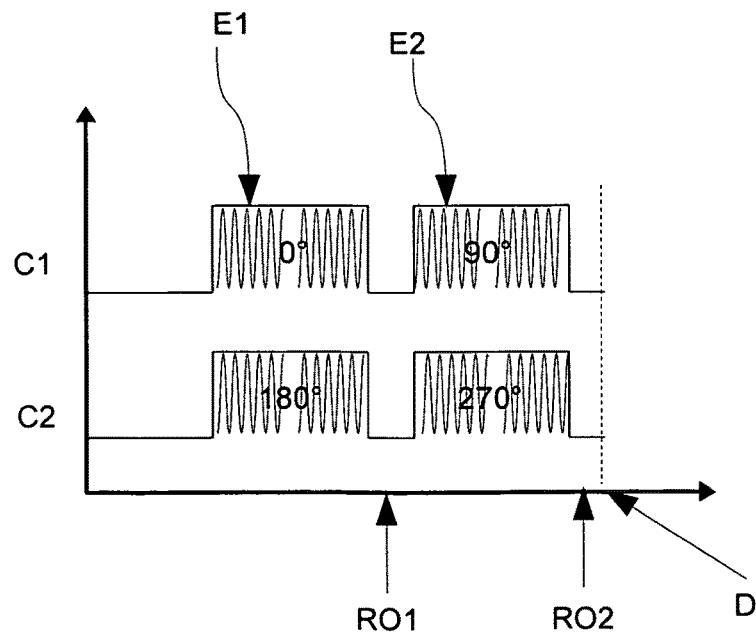
Figure 1C:
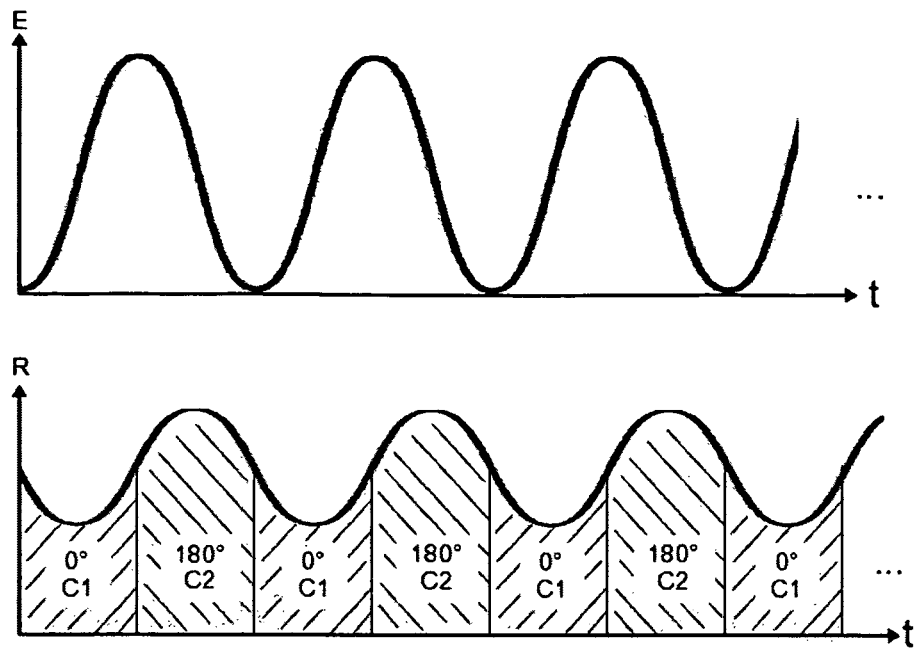
Figure 1D:
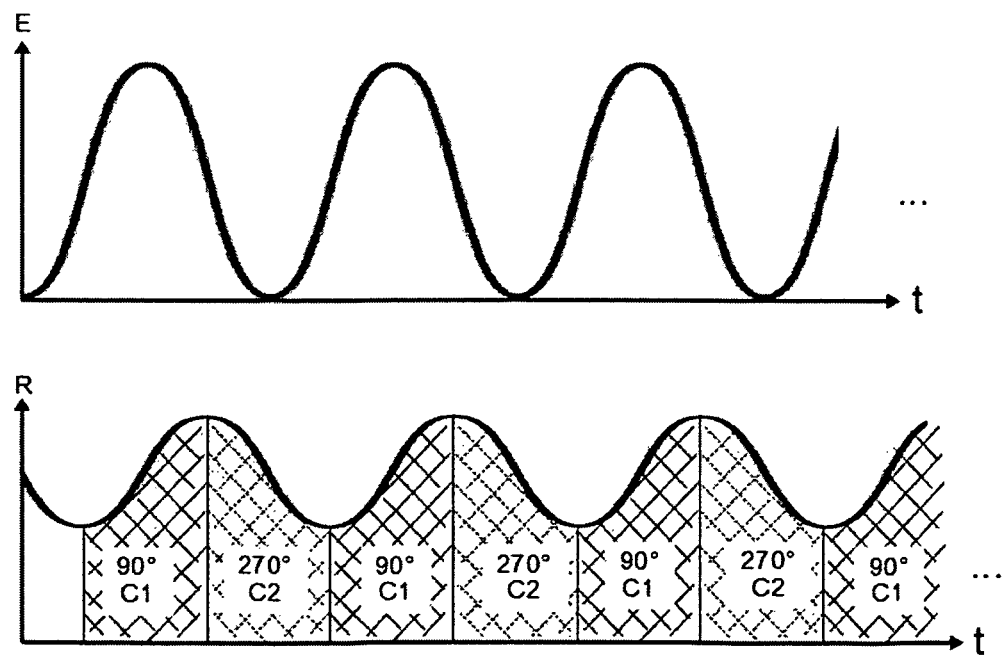

Commercially available 3 dimensional time-of-flight measurement systems are either based on sine wave or pseudo-noise modulation. Both require at least three samples to derive phase or depth information respectively, offset, and amplitude information. For design simplification and signal robustness reasons, time-of-flight systems commonly sample four times the impinging light signal. However, the most sensitive and therefore most widely used time-of-flight pixel architecture includes only two storage nodes, as sketched in FIG. 1a. In order to get the four samples, the system then requires the acquisition of at least two subsequent images. The timing diagram of the sine wave sampling is sketched in FIG. 1b. This received light signal generates on the pixel from FIG. 1a a photo-current, which is then sampled and integrated during a first exposure E1, as represented in FIG. 1b. The first exposure E1 is followed by a readout RO1. A second exposure E2 acquires the samples delayed by 90° compared to E1. After the exposure E2, the newly acquired samples are readout RO2. At this point in time D, all data is ready to enable to determine phase, offset and amplitude information of the received signal. A time zoom in the sampling procedure of E1 is sketched in FIG. 1c, a time zoom into exposure E2 in FIG. 1d, respectively. The sampling duration is assumed to be half of the period and is integrated over many thousands up to millions of periods. During such a first exposure E1, the samples at 0° and 180° are directed by the switches SW1 and SW2 to the storage nodes C1 and C2, respectively, as sketched in FIG. 1c. A zoom into the second exposure E2 is sketched in FIG. 1d. The second exposure E2 has the samplings delayed by 90° compared to the first exposure E1. Samples 90° and 270° are again integrated in storage node C1, C2. Integration time of exposure E1 and exposure E2 are the same. At point in time D, when all four samples have been measured and are available, the phase, amplitude and offset information can be calculated, whereas the phase information directly corresponds to the distance information of the measured object.

Figure 2:
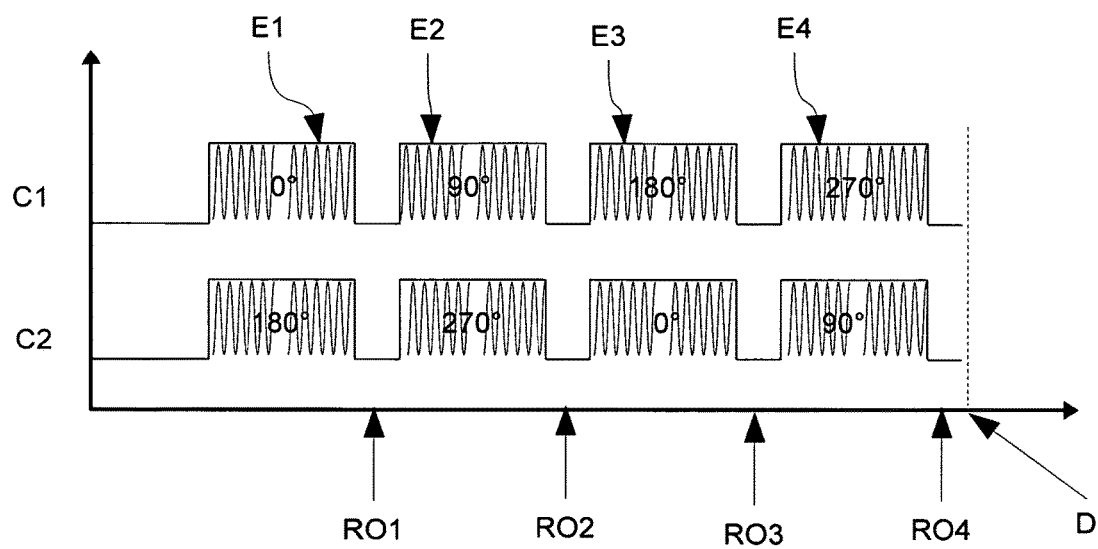
FIG. 2 shows the most common used prior art acquisition timing of the four samples required to derive depth measurement on time-of-flight 3 dimensional imaging systems.

However, due to mismatches, most implementations actually acquire four instead of only two images, as proposed in U.S. Pat. No. 7,462,808B2 and sketched in FIG. 2. The first exposure E1 and the second exposure E2 and their readouts RO1 and RO2 are performed as described in FIG. 1b but those exposures are followed by two more exposures E3 and E4 and readouts RO3 and R04. Exposure E3 acquires the samplings from first exposure E1 but delayed by 180°, and the exposure E4 corresponds to a 180° phase delay of exposure E2. At point in time D, all four samples are available to calculate phase (or depth respectively), offset and amplitude information of the received signal. As described in U.S. Pat. No. 7,462,808B2, this approach enables to compensate for e.g. pixel circuitry and response mismatches or driving non-symmetries.

Figure 3A:
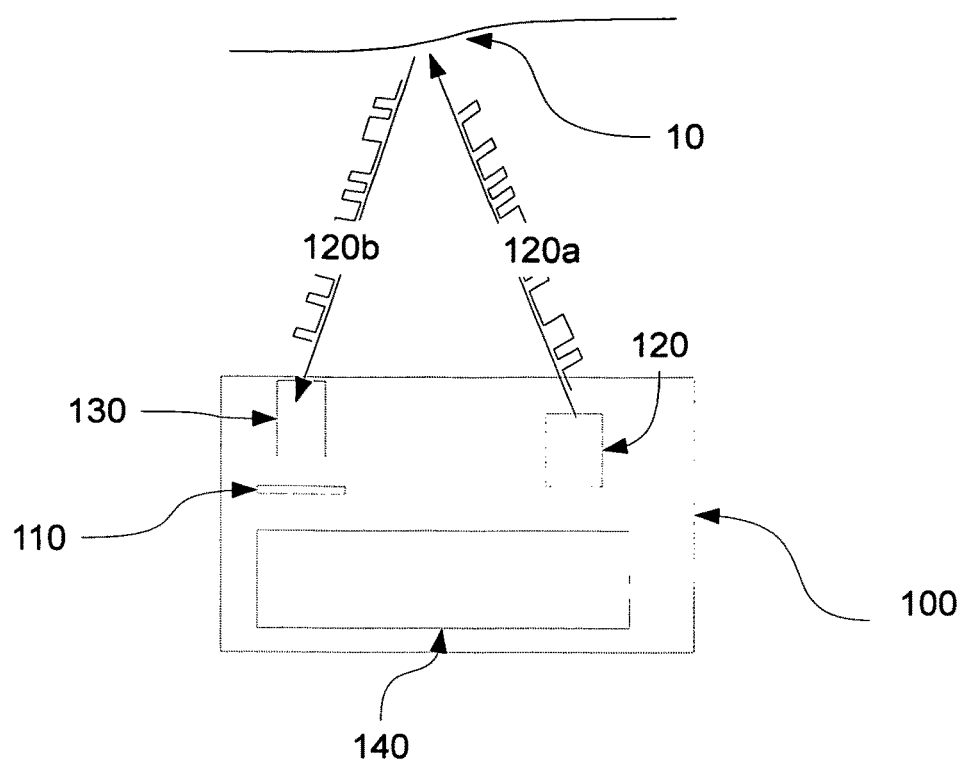
FIG. 3 a) illustrates an imaging system 100 according to the invention with the time-of-flight image sensor 110 and the active illumination source 120, both controlled and synchronized by the controller 140, b) an embodiment of a rough timing diagram according to the invention and c) an embodiment of a more detailed timing diagram according to the invention.
Figure 3B:
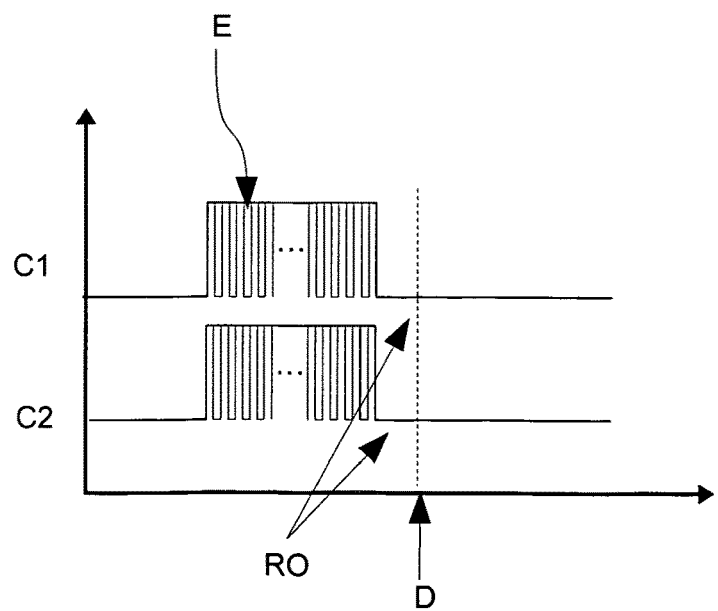
Figure 3C:
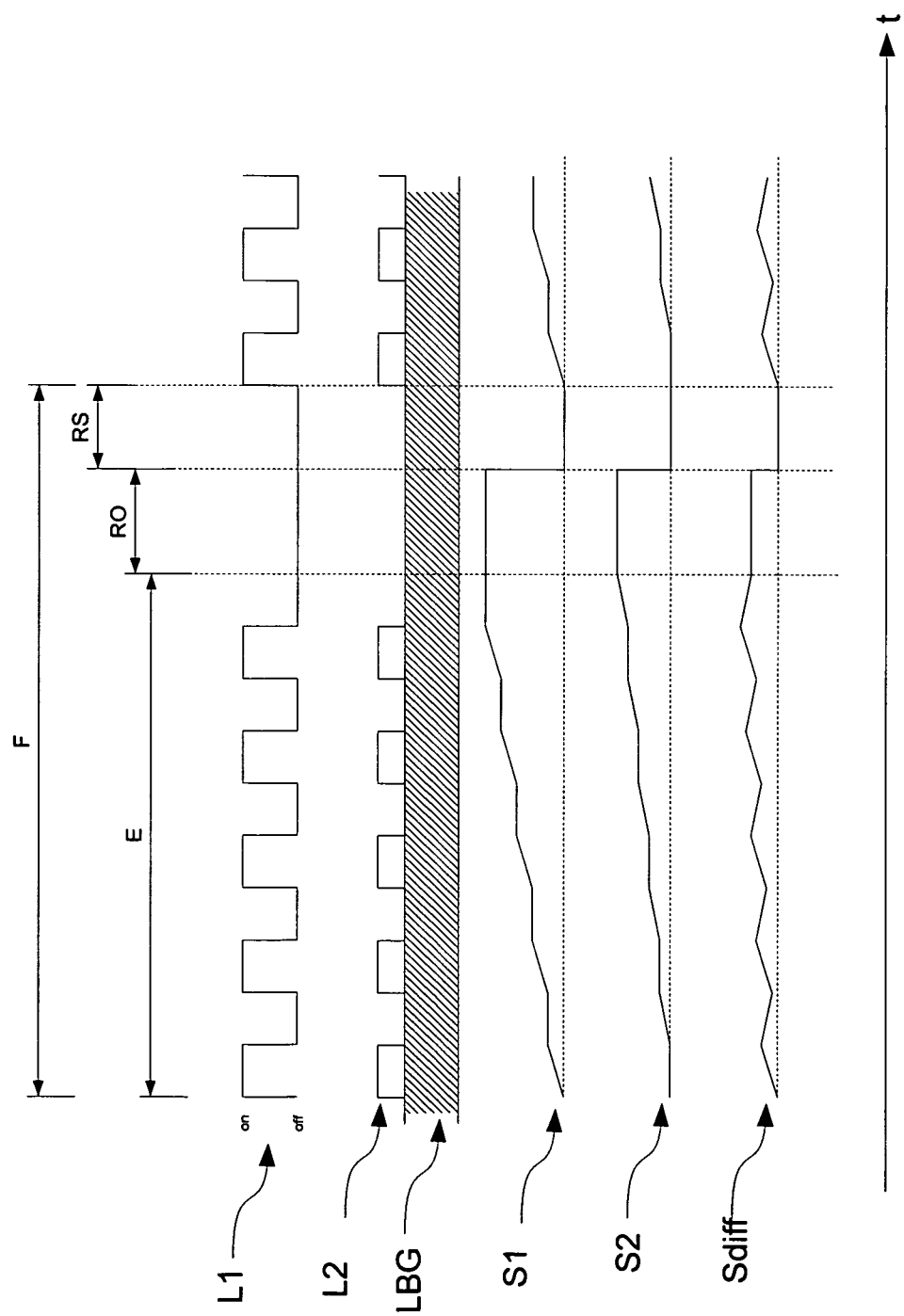

A first general embodiment according to the invention based on an imaging system 100 is depicted in FIG. 3a, its rough timing on FIG. 3b and a more detailed timing in FIG. 3c. The imaging system includes a time-of-flight image sensor 110 consisting of time-of-flight pixels as illustrated in FIG. 1a, an illumination source 120, an optical system 130 and a controller 140. The emitted light 120a is reflected by the object 10. The back-reflected light 120b is imaged by the optical system 130 onto the time-of-flight image sensor 110. The time-of-flight image sensor 110 and the illumination source 120 are temporally modulated and synchronized by the controller 140 such that one storage node of the time-of-flight pixels on the time-of-flight image sensor 110 integrate all photo-generated electrons while the illumination source 120 is turned on, and a second storage node collects all photo-generated electrons when the illumination source 120 is turned off. This on/off cycle might be repeated many times. The present invention proposes to apply such low modulation frequencies to the high-speed time-of-flight image sensor and pixels that the actual impact of the time of flight of the emitted and back-reflected light is negligible and all emitted light is preferably captured into a single storage node of each pixel on the time-of-flight image sensor. Further, as depicted in FIG. 3b, it is proposed to only capture a reduced number of samples and acquisitions, which does not enable to derive actual time-of-flight measurements. A first exposure E is followed by the readout RO. During the exposure E, photo-generated charges are either transferred to storage node C1 or storage node C2, synchronized with the illumination source 120. In the given embodiment, one single acquisition rather than the at least two or four acquisitions as required to gather all necessary (at least three) samples to derive TOF information is proposed. At the point in time D, the number of samples does not allow to deduce time-of-flight information of the captured signal. On that single exposure example as variant of the invention, differential imaging of the two samples is carried out. The modulation can be done in a pseudo-random way as hinted in FIG. 3a. By doing so, disturbing interferences between different imaging systems 100 can be minimized. Next to pseudo-random coding, other known techniques such as phase hopping or frequency hopping, chirping or other division multiple access approaches can be implemented to minimize interferences of the systems.

FIG. 3c shows the timing diagram of the single exposure as sketched in FIG. 3b in more detail, including a circuitry subtracting the two storage nodes C1 and C2 from each other during the integration. F describes the total frame, E is the actual exposure, RO the readout time and RS the reset time. The modulation frequency on the present timing of the embodiment is much lower than required to do reasonable time-of-flight imaging. The light L1 is emitted by the illumination source 120 and synchronized with the time-of-flight image sensor 110, such that during the "light on" time all photo-generated charges are transferred to the first storage node C1, while all during the "light-off"-time photo-generated charges are transferred to the second storage node C2. The back-reflected and received light signal over time t is plotted as L2 and has some background light component LBG. S1 illustrates the integration on the first storage node C1 during the "light on time", S2 shows the integration on storage node C2 during the "light-off" time. Sdiff shows the signal difference, when actual in-pixel background removal is implemented. In-pixel circuitry C builds the difference and, by doing so, removes the background light signal. In the illustrated example, the time-of-flight pixel on the time-of-flight image sensor 110 performs a direct subtraction of the two nodes during integration on Sdiff. In other implementations, the time-of-flight pixel performs the subtraction at the end of the integration time. Both implementations increase the dynamic range of the active imaging system. The "light-on" and "light-off" times are repeated many times during the exposure E. Modulation frequencies in the range of hundreds of Hz to below MHz enable to reduce the impact of the arrival time of the light pulses. The total integration time into the first storage node C1 and into the second storage node C2 of the time-of-flight pixel are preferably equivalent during the exposure, in order to integrate the same amount of background light to the two storage nodes on the time-of-flight image sensor's 110 pixels and to subtract the same background or common mode level on those samples. If the two exposure times are kept the same, the light pulses might even be shorter than the sample duration into its storage node. This further ensures that there is no impact on the arrival time of the pulse. In any case, to have best possible background light removal, the total exposure time into the two storage nodes should be the same. After the exposure E, the pixel values are read out RO and transferred to the controller 140. Before starting the next acquisition, the pixels are typically reset RS. In order to reduce mismatches in the photo-response on the two storage nodes, a second exposure with inverted switching compared to the first exposure E, and subtracting the two images may be beneficial depending on the image sensor pixel's photo-response. However, the number of acquired samples would still not suffice to derive time-of-flight information.

Figure 4:
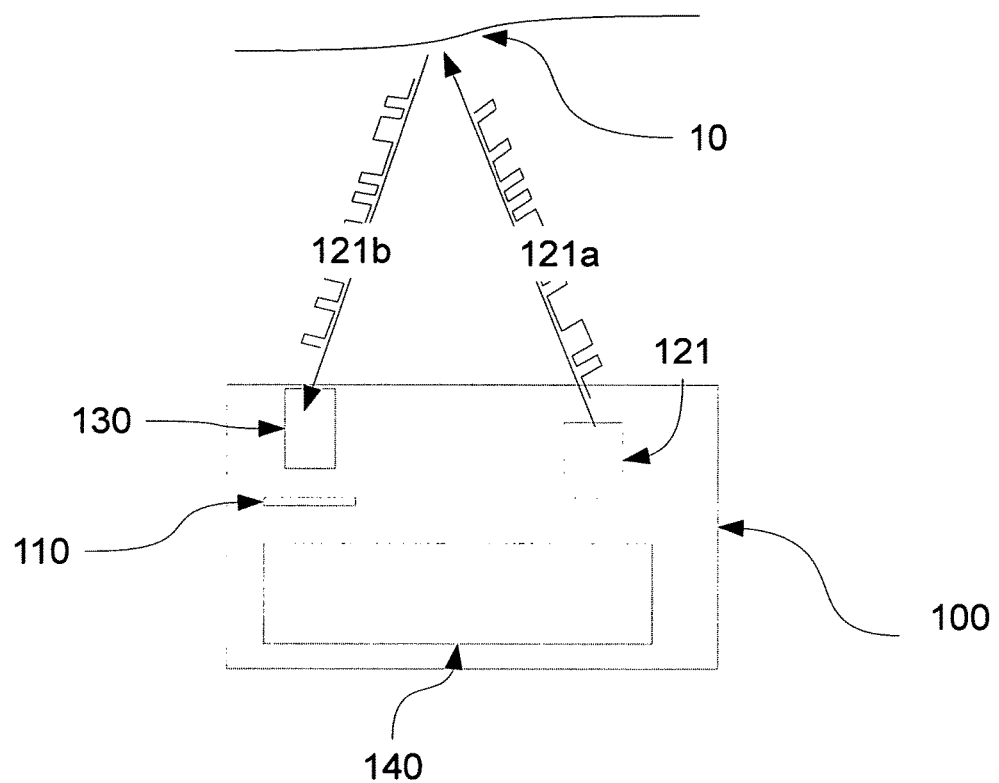
FIG. 4 shows a imaging system 100 according to the invention based on a structured illumination source 121.

FIG. 4 shows an imaging system 100 according to the invention. The imaging system 100 includes a time-of-flight image sensor 110 that consists of time-of-flight pixels as sketched in FIG. 1*a*, an optical system 130, a structured illumination source 121 and a controller 140. The controller 140 further synchronizes and temporally modulates the time-of-flight image sensor 110 and the structured illumination source 121. The structured illumination source 121 emits the temporally modulated light 121*a*, which is reflected by the object 10. The back-reflected light 121*b* by the scene 10 is projected by an optical system 130 on the time-of-flight image sensor 110, on which the time-of-flight pixels demodulate the incoming signal into two storage nodes. The timing of the imaging system 100 can be similar to the one described in FIG. 3. The structured illumination source and the 3 dimensional mapping techniques can be applied as presented by the PCT publication WO2007/105205A2. For the structured illumination source, projection techniques based on speckles caused by interference as described in WO2007/105205A2 might be used, however, other pattern projection techniques might be applied to structured illumination source 121, e.g. with refraction based optics or pattern generating masks. Preferably, a random dot pattern is projected. EP2519001A2 teaches the use of a structured light system based on a sensor with specifically designed sensor pixels with transfer gates to first and second storage nodes and using standard slow photo-diodes. The present invention in contrary proposes not to apply a specific pixel design, but rather use an existing high-speed time-of-flight image sensor 110 and pixels, apply such low modulation frequency by the controller 140 on the structured illumination source 121 and the time-of-flight image sensor 110, that the impact of the actual travel time of the light (time-of-flight) is negligible, and perform the sampling and storage of the back-reflected light 121*b* on the time-of-flight image sensor 110. Further, the time-of-flight image sensor 110 is proposed to operate in a mode, that the at least three required samples are not captured, but the reduced number of samples from the time-of-flight image sensor 110 are evaluated. The typical 90° phase shift as it is required for the time-of-flight imaging system is abandoned and only the differential image resulting from the two storage nodes on all pixels on the time-of-flight image sensor 110, is evaluated. All afore referenced high-speed time-of-flight image sensors are capable to demodulate the reflected light temporally into at least two storage nodes at such low frequencies unusable for actual time-of-flight measurement system. Further, all of the afore-referenced high-speed time-of-flight image sensors allow the acquisition of a reduced number of samples than required for time-of-flight image sensing. Therefore all those reference pixel designs can be integrated just as time-of-flight image sensor according to the invention. With appropriate in-pixel circuitry, the time-of-flight image sensor 110 can subtract a common signal level from the samples, or simply subtract the two storage node samples from each other. On the one hand, this increases the dynamic range of the imaging system and on the other hand, simplifies the correlation algorithms for the depth mapping since the dynamic background light signals are removed in the image. Further, by applying appropriate temporal modulation schemes such as code or frequency division multiple accesses, disturbing interferences of different structured light 3 dimensional imaging systems can be avoided.

Ideally, the time-of-flight pixels on the time-of-flight image sensor 110 transfer charges during the "light-on" time into a first storage node and charges during the "light-off" time into a second node and perform the subtraction. The temporal modulation and the background cancellation circuit of the time-of-flight pixels add to the structured light system all the advantages described above. The modulation frequency is preferably in the range of a few 100 Hz up to 1 MHz, too low for actual TOF measurements. Such an imaging system 100 as described in FIG. 4, including a structured illumination source 121 and a time-of-flight sensor 100, both operated at modulation frequencies far below modulation frequencies required for time-of-flight imaging, will drastically increase the dynamic range of existing 3 dimensional imaging system as described in the PCT publications WO2007/105205A2 and/or W2014/014341A1.

Figure 5:
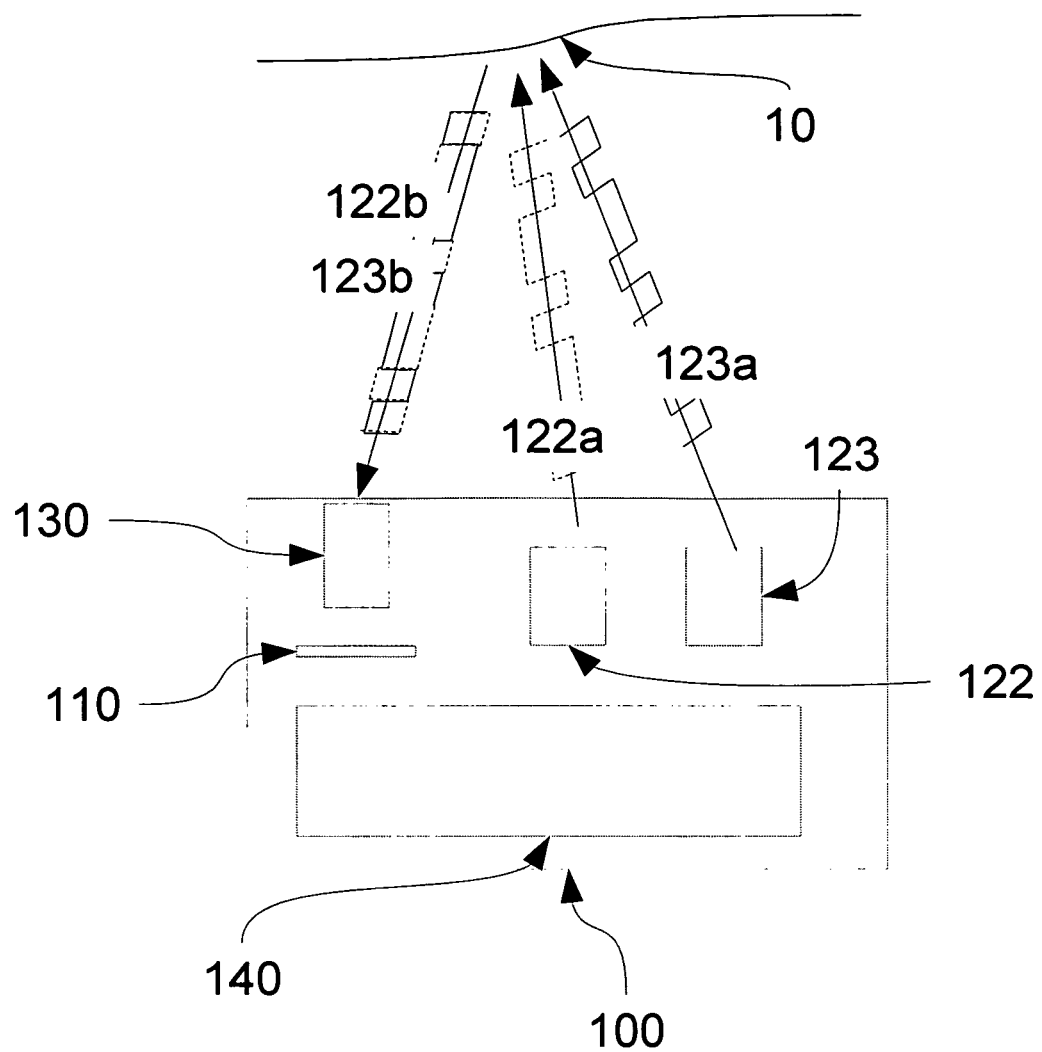
FIG. 5 illustrates an imaging system 100 according to the invention for eye/pupil detection applications based on two illumination sources 122 and 123 with different wavelengths in the near infrared range and a time-of-flight image sensor (110)

FIG. 5 represents an imaging system 100 according to the invention, used as fatigue sensor. The present embodiment enables to build a highly robust eye tracking system, which can be used e.g. for driver's drowsiness measurement or fatigue estimation. The imaging system 100 according to the invention includes two different illumination sources, each having a wavelength in the near infrared range, whereas a first illumination source of a first wavelength 122, is at e.g. around 850 nm, and a second illumination source of a second wavelength 123, is at e.g. around 940 nm. It further includes a time-of-flight image sensor 110 with time-of-flight pixels according to FIG. 1*a*, an optical system 130 and a controller 140. Both illumination sources 122 and 123 are synchronized with the time-of-flight image sensor 110 by the controller 140. During the exposure, when the first illumination source of a first wavelength 122 is turned on, the second illumination source of a second wavelength 123 is turned off and vice versa. The first illumination source of a first wavelength 122 emits the light 122*a*, the second illumination source of a second wavelength 123 emit the light 123*a*. The back-reflected light 122*b* of the first illumination source of a first wavelength 122 will be imaged by the optical system 130 on the time-of-flight pixels of the time-of-flight image sensor 110 and transferred to the first storage nodes on the time-of-flight pixels, while the back-reflected light 123*b* from the illumination source of a second wavelength 123 will be captured by the same time-of-flight image sensor 110 and transferred into the time-of-flight pixels' second storage nodes. After the exposure and by doing a differential readout or on-pixel signal subtraction, the difference image of the two illumination sources can directly be measured. Since the retina of a human eye still shows direct reflection at around 850 nm and strongly reduced reflection at around 940 nm, the pupils will clearly be seen in the difference image and can be tracked easily and robustly. The pupil can easily be identified in the differential image and the opening and closing of the eyes be detected. Based on the blinking, the PERCLOS value (proportion/percentage of time in a minute that the eye is 80% closed) or a drowsiness factor of e.g. a bus driver can be measured and corresponding actions initiated. State-of-the-art methods to determine the drivers drowsiness are mainly based on standard imaging and heavy image processing as described by Hammoud et al. in U.S. Pat. No. 7,253,739B2.

Figure 6:
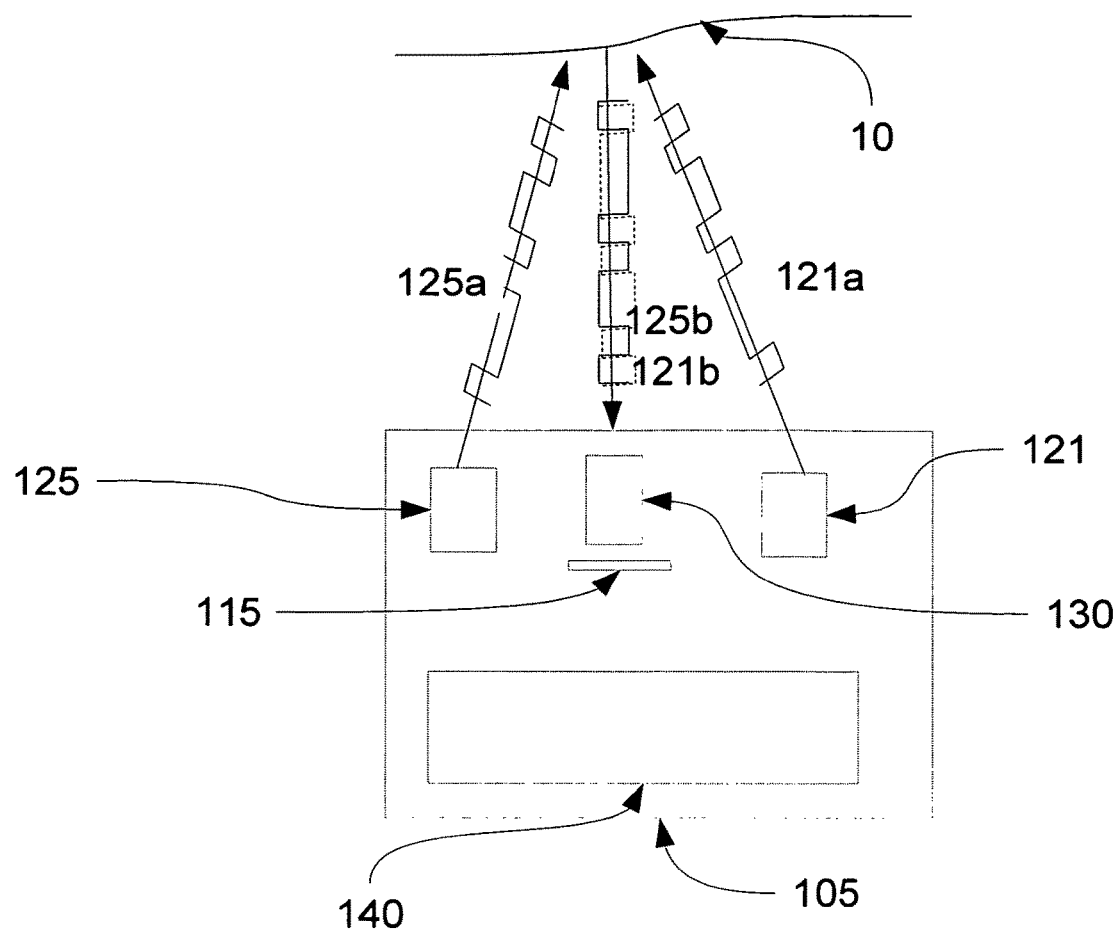
FIG. 6 shows a imaging system 105 according to the invention, that includes a first structured illumination source 121 and a second differently structured illumination source 125.

The embodiment of the imaging system 105 sketched in FIG. 6 illustrates a 3 dimensional imaging system according to the invention. The imaging system 105 includes a first structured illumination source 121 and a second structured illumination source 125 of a different type of structure. Both illumination sources are at near infrared wavelength. Further, the imaging system includes an image sensor 115, an optical system 130 and a controller 140. The system 105 is setup using a first structured illumination source 121 and a second structured illumination source 125, and both illumination sources are placed next to the image sensor 115. A controller 140 synchronizes the structured illumination sources 121, 125 and the image sensor 115. The two illumination sources 121 and 125 are preferably placed such as to minimize occlusion. The emitted light 121a from the first structured illumination source 121 is reflected and the back-reflected light 121b is projected by the optical system 130 on the image sensor 115. The emitted light 125a from the second structured illumination source 125 is reflected, too, and the back-reflected light 125b is projected by the same optical system 130 on the same image sensor 115, too. During the acquisition, the illumination sources 121 and 125 may be temporally modulated and in that case, are preferably inverted during exposure such that all light from the first structured illumination source 121 can be collected in a first storage node of the pixel on the image sensor 115, and back-reflected light 125b from second structured illumination source 125 is collected in a second storage node of the pixels on the image sensor 115. Temporal modulation such as square wave or pseudo noise or others can be imagined. In case the pixels on the image sensor 115 include background subtraction circuitry, the signal from the first structured illumination source 121 will be positive; the signal from the second structured illumination source 125 will be negative. The drawback of this approach and having the two illumination sources physically separated but temporally interleaved is that pixels including signal from the first structured illumination source 121 and the second structured illumination source 125 may cancel each other. Therefore, one might think to have the first structured illumination source 121 e.g. with a random speckle pattern and the second structured illumination source 125 with a stripe shape pattern. Further, it is imaginable that both structured illumination sources are integrated as structured patterns on the same emitting die e.g. a VCSEL array. The VCSEL array may consists of a first group of emitting laser diodes corresponding to the first structured illumination source 121 that can be controlled differently than a second group of emitting laser diodes corresponding to the second structured illumination source 125, both groups are on the same VCSEL array die. An array of VCSEL on the same die, used as projector for an imaging system based on a structured illumination source, with the full array controlled by a single driving signal is presented in publication US2013038881A1.

One can imagine to have the first group of laser diode emitting spots randomly placed on the die, whereas the second group of laser diode emitting spots from the same die and have the same pattern but are all slight shifted. By projecting this VCSEL array pattern the spots projected from the first group of laser diodes or first structured illumination source 121 and the spots projected from the second group of laser diodes or second structured illumination source 125 would not interfere with each other in space, since their spots are physically separated on the VCSEL array die, and their emitted light is projected in space by the same projection optics. Further, the two groups of lasers diodes may be controlled in such a way that all back-reflected light 121b of the first structured illumination source 121 is stored on a first storage node of the pixels on the image sensor 115 and all back-reflected light 125b from the second structured illumination source 125 is stored on the second storage node of the pixels on the image sensor 115. Further, the pixels on the image sensor 115 may include a background cancelling circuitry to enhance the dynamic range. Further, the image sensor 115 may be a time-of-flight image sensor 110.

Figure 7:
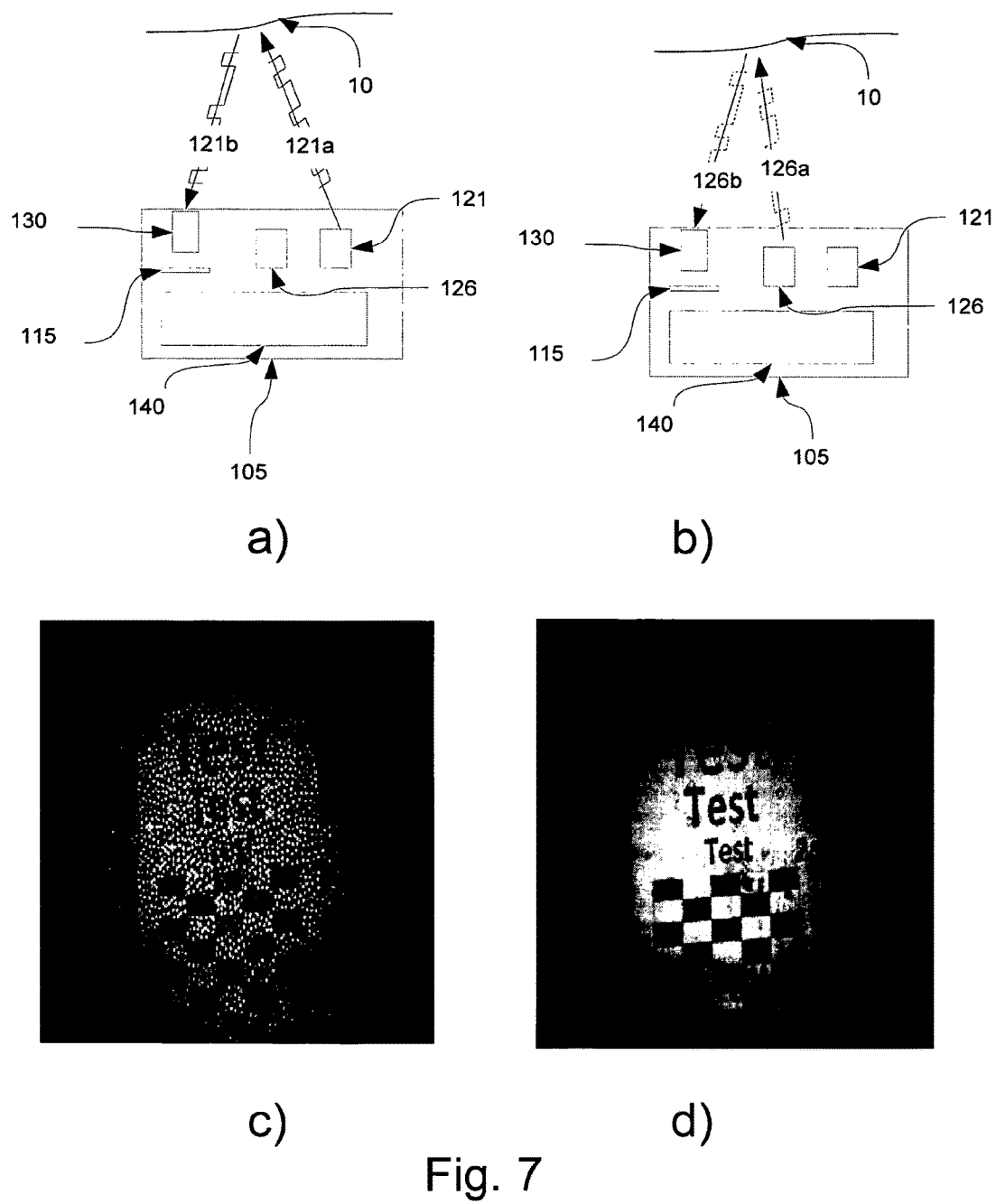
FIG. 7 shows an embodiment of an imaging system according to the invention, which enables to gather three-dimensional and colour or greyscale information from the scene/object through the same optical path and image sensor. a) illustrates the operation of the acquisition to acquire depth information. A sample greyscale image captured with a structured illumination source is shown in c). b) plots the imaging system and its operation during the acquisition of the greyscale image and the resulting greyscale image is plotted in d)

FIG. 7a to d illustrates an embodiment according to the invention of an imaging system 105 including a structured illumination source 121, a uniform illumination source 126, an optical system 130, an image sensor 115 and a controller 140. Both illumination sources have a wavelength in the near infrared range. In a first exposure, illustrated in FIG. 7a, the structured illumination source 121 is turned on, while the uniform illumination source is turned off. As hinted by the drawing in FIG. 7a, the structured illumination source 121 may be modulated and synchronized by the controller 140 with the image sensor 115. The emitted light 121a from the structured illumination source 121 reaches an object 10 and is reflected. The back-reflected light 121b form the structured illumination source 121 is imaged by the optical system 130 onto the image sensor 115. The image from the structured illumination source 121 captured by the images sensor 115 can be used in a traditional way to derive depth information from the scene. However, the acquired greyscale image delivered by the image sensor 115 based on the structured illumination source 121 is not representative and objects and details are only vaguely recognizable in many cases. Such a greyscale image based on a structured illumination source 121 with a random dot pattern is illustrated in FIG. 7c. The loss of details is clearly visible. To still be able to have a conventional image, state-of-the-art imaging systems based on structured illumination sources add next to the first image sensor 115 a second image sensing device with its own optical path to the image sensor. The second image sensor typically is an RGB sensor and delivers a completely independent colour image. However, a second image acquired through a different optical path is first of all costly and second results in many challenges in mapping the two images. An embodiment of the invented method proposes to acquire a second image with the imaging system 105, having a uniform illumination source 126 turned on and using the same optical system 130 and image sensor 115. The emitted light 126a from a uniform illumination source 126 reaches an object 10 in the scene and is reflected. The back-reflected light 126b from the uniform illumination source 126 is imaged by the optical system 130 on the image sensor 115. The operation of the second image acquisition is depicted in FIG. 7b. As hinted in the drawing in FIG. 7b, the uniform illumination source 126 and the image sensor 115 may be synchronized and modulated by the controller 140. A resulting greyscale image of this second image based on the uniform illumination source 126 is presented in FIG. 7d.

Details are now much better visible, mapping the 3 dimensional image from the structured illumination source 121 and the greyscale image from the uniform illumination source 126 is simple.

In order to implement an appropriate optical bandpass filter in the optical system 130, it is advantageous to have similar wavelengths for the structured illumination source 121 and the uniform illumination source 126. Further, the structured illumination source 121 and the uniform illumination source 126 may be synchronized and modulated with the image sensor 115 by the controller 140. The image sensor 115 may further have in-pixel background cancelling circuitry in order to increase the dynamic range.

Further, the image sensor 115 may be a time-of-flight image sensor 110.

Figure 8:
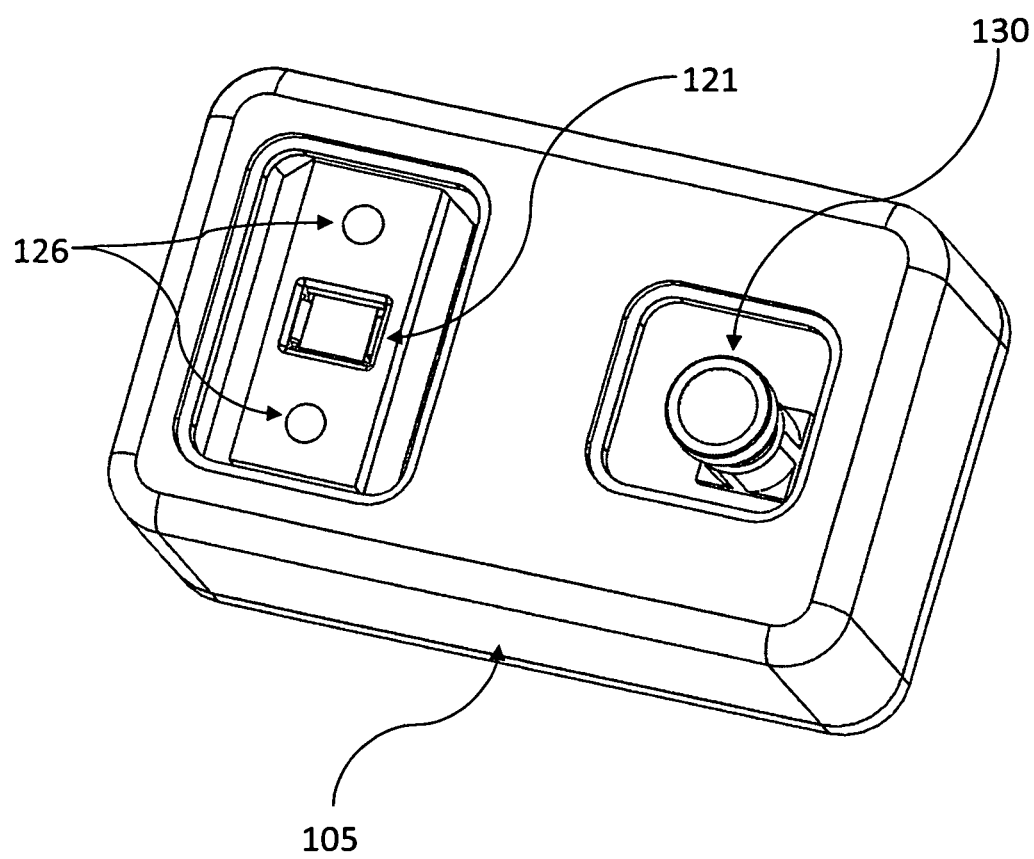
FIG. 8 shows an actual design according to the invention.

FIG. 8 shows an actual embodiment according to the invention. The imaging system 105 includes an optical system 130, a structured illumination source 121, and a uniform illumination source 126, each illumination source having a wave-length in the near infrared range. The image sensor 115 behind the optical system and the controller 140 are hidden behind the housing of the imaging system 105 and therefore cannot be seen in the drawing. In the given example in FIG. 8, the uniform illumination source 126 consists of two equal illumination sources, placed next to the structured illumination source 126, which is centred. The image captured by the image sensor 115 based on the uniform illumination source 126, can be used as representative greyscale illustration of the scene, while the image captured by the image sensor 115 based on the structured illumination source 121 can be used to derive depth information based on the triangulation principle. The wavelength of the structured illumination source 121 and the uniform illumination source 126 are preferably similar to enable the implementation of a narrow bandpass filter in the optical system 130 to cut off as much of the background light as possible while passing as much of the light from the structured illumination source 121 and the uniform illumination source 126 as possible onto the image sensor 115. Further, the image sensor 115 and the structured illumination source 121 may be synchronized and modulated as explained in FIG. 7. Further, the uniform illumination source 126 and the image sensor 115 may be synchronised and modulated as explained in FIG. 7. Further, the image sensor 115 might be a time-of-flight image sensor 110 and preferably, includes an in-pixel background cancellation circuitry. Based on the image based on the uniform illumination source 126, appropriate image processing algorithms may improve the depth map reconstructed by the evaluation of the image based on the structured illumination source 121.

In all of the afore-mentioned implementations with modulated illumination source, the light source pulses have preferably the same or shorter duration than the samplings to one of the storage nodes. Further, the sampling duration to the storage nodes is preferably equal to the two nodes, in order to have equal background light in both storage nodes that is cancelled.

The structured illumination source is understood as a spatially modulated light source, emitting a fixed pattern. Possible patterns are speckle patterns (random, pseudo-random or regular), stripe patterns, random binary patterns, etc.

The invention claimed is:

1. An imaging system comprising:
   a time of flight imaging sensor;
   first and second different illumination sources each having a respective wavelength in the near infrared range; and
   a controller operable to apply a modulation frequency to the time of flight imaging sensor and to the first and second illumination sources such that the time of flight imaging sensor and the first and second illumination sources are synchronized with one another, and such that during an exposure, when the first illumination source is on, the second illumination source is off, and when the second illumination source is on, the first illumination source is off,
   the imaging system being operable to process an image of a scene being illuminated by the first and second illumination sources.

2. The imaging system according to claim 1, wherein the wavelengths of the first and second illumination sources differ from one another.

3. The imaging system according to claim 1, wherein at least one of the illumination sources is a structured illumination source.

4. The imaging system according to claim 1, wherein at least one of the illumination sources is a uniform illumination source.

5. The imaging system according to claim 1, wherein at least one of the illumination sources is a illumination source which is temporally modulated.

6. The imaging system according to claim 1, wherein the first and second different illumination sources are on the same light emitting die.

7. The imaging system according to claim 1, wherein the imaging sensor is a time of flight sensor.

8. An imaging system comprising:
   a time of flight sensor having a pixel architecture designed to handle operation at 10 MHz or more;
   an illumination source;
   a controller operable to apply a modulation frequency in a range of 100 Hz to 1 MHz to the time of flight sensor and to the illumination source such that the time of flight sensor and the illumination source are synchronized with one another, the controller further operable to sample output signals from the time of flight sensor based on light produced by the illumination source and reflected by an object.

9. The imaging system according to claim 8, wherein the imaging system is operable to perform a direct subtraction at a pixel level of the time of flight sensor.

10. The imaging system according to claim 8, wherein the illumination source includes a structured illumination source.

11. The imaging system according to claim 8 comprising at least two illumination sources having different wavelengths from one another, wherein the controller is operable to synchronize each of the illumination sources with the time of flight sensor.

12. The imaging system according to claim 8, illumination source includes a pseudo-random modulated illumination source.

13. The imaging system according to claim 1 wherein the first illumination source is operable to produce a random speckle pattern, and the second illumination source is operable to produce a stripe shape pattern.

14. The imaging system according to claim 1 wherein the a time of flight imaging sensor includes a plurality of pixels each of which has a respective first and second storage node, wherein the imaging system is operable such that light produced by the first illumination source, reflected by an object and detected by a particular pixel is transferred to the pixel's first storage node, and such that light produced by the second illumination source, reflected by the object and detected by the particular pixel is transferred to the pixel's second storage node.

* * * * *